US 12,406,643 B1

(12) United States Patent
Spriggel

(10) Patent No.: US 12,406,643 B1
(45) Date of Patent: Sep. 2, 2025

(54) MOUNTING SYSTEM WITH AXIAL POSITION ADJUSTER

(71) Applicant: Daniel John Spriggel, Henderson, NV (US)

(72) Inventor: Daniel John Spriggel, Henderson, NV (US)

( * ) Notice: Subject to any disclaimer, the term of this patent is extended or adjusted under 35 U.S.C. 154(b) by 0 days.

(21) Appl. No.: 19/191,883

(22) Filed: Apr. 28, 2025

Related U.S. Application Data

(60) Provisional application No. 63/672,851, filed on Jul. 18, 2024.

(51) Int. Cl.
| G10D 13/065 | (2020.01) |
| F16M 11/04 | (2006.01) |
| G10G 5/00 | (2006.01) |

(52) U.S. Cl.
CPC ............. *G10G 5/00* (2013.01); *F16M 11/046* (2013.01); *G10D 13/065* (2013.01); *F16M 2200/025* (2013.01)

(58) Field of Classification Search
CPC ...... G10D 13/065; G10G 5/00; F16M 11/046; F16M 2200/025
See application file for complete search history.

(56) References Cited

U.S. PATENT DOCUMENTS

| 5,139,381 | A * | 8/1992 | Lubreski | F16B 37/0857 |
| | | | | 411/433 |
| 7,326,843 | B2 * | 2/2008 | Tanaka | F16B 9/056 |
| | | | | 411/259 |
| 9,053,693 | B1 * | 6/2015 | Wei | G10H 3/00 |
| 9,224,372 | B1 * | 12/2015 | Spriggel | G10D 13/28 |
| 9,230,523 | B1 * | 1/2016 | Spriggel | G10D 13/063 |
| 9,343,049 | B1 * | 5/2016 | Spriggel | G10D 13/063 |
| 11,854,516 | B1 * | 12/2023 | Spriggel | G10D 13/28 |
| 12,109,671 | B2 * | 10/2024 | Basson | B25B 29/02 |
| 2006/0169124 | A1 * | 8/2006 | Tanaka | G10D 13/065 |
| | | | | 84/422.3 |
| 2015/0096430 | A1 * | 4/2015 | Sikra | F16B 39/32 |
| | | | | 84/422.3 |
| 2022/0226976 | A1 * | 7/2022 | Basson | B25B 29/02 |
| 2024/0144898 | A1 * | 5/2024 | Recchia | G10H 1/34 |

* cited by examiner

*Primary Examiner* — Robert W Horn
(74) *Attorney, Agent, or Firm* — Fennemore Craig, P.C.

(57) ABSTRACT

A position adjuster for adjusting an axial position of an article mounted to an elongate member with a slip nut assembly includes a first member adapted to be mounted to the slip nut assembly. The first member defines a central aperture therein that is sized to receive the elongate member and also includes a threaded portion that is substantially concentric with the central aperture. A second member defines a central aperture therein that is sized to receive the elongate member. The second member also comprises a threaded portion that is substantially concentric with the central aperture and threadably engagable with the threaded portion of the first member so that relative rotation between the first and second members changes an axial distance between a surface of the second member and the slip nut assembly when the slip nut assembly is locked in the defined axial position along the elongate member.

20 Claims, 11 Drawing Sheets

MOUNTING SYSTEM WITH AXIAL POSITION ADJUSTER

CROSS-REFERENCE TO RELATED APPLICATION

This application claims the benefit of U.S. Provisional Patent Application No. 63/672,851, filed on Jul. 18, 2024, which is hereby incorporated herein by reference for all that it discloses.

TECHNICAL FIELD

The disclosed instrumentalities relate to axial fasteners in general and more specifically to fasteners for holding musical cymbals at defined axial positions along elongate members.

BACKGROUND

A musical cymbal is commonly mounted to a rod provided on a cymbal stand. In a typical arrangement, the rod is provided with a lower flange that is fixed at an axial position along the rod. The cymbal is mounted on the rod, typically by placing at least one pad, such as a felt pad, between the cymbal and the lower flange. The cymbal may be retained on the rod by an upper fastener, such as a collar or threaded nut, typically again with at least one pad positioned between the upper fastener and cymbal. While this arrangement is functional, it is not without its drawbacks. For example, in embodiments wherein the upper fastener comprises a collar, the collar must be separately fastened, typically by a thumbscrew, at a desired axial position along the rod. In embodiments wherein the upper fastener comprises a threaded nut, such as a wing nut, the nut must be threaded on threads provided on the upper section of the rod, which may be tedious and time-consuming, particularly in situations wherein the cymbal assembly must be assembled and disassembled frequently.

It is also sometimes desirable to 'fine tune' the axial position of the cymbal in order to change the musical characteristics of the cymbal. Such fine tuning can be difficult in embodiments using a collar and thumbscrew, in that it is often times difficult to achieve the fine axial positioning typically required to achieve the desired cymbal 'tune.' While embodiments using threaded nuts are easier to adjust at a fine level, the use of threaded nuts still have their drawbacks as noted above.

A slip nut assembly, such as that disclosed in U.S. Pat. No. 11,854,516, addresses some of the drawbacks associated with the use of collars and threaded nuts. For example, the slip nut assembly dispenses with the need for the user to use rotatable nuts, e.g., wing nuts, to secure the cymbal to the rod. Instead, the user simply moves the slip nut assembly along an elongate member. When the slip nut assembly is in the desired axial position, the user simply locks the slip nut assembly in place. The slip nut assembly thereby significantly speeds assembly and disassembly compared with conventional cymbal mounting systems.

SUMMARY

A position adjuster assembly for adjusting an axial position of an article mounted to an elongate member with a slip nut assembly may include a first member adapted to be mounted to the slip nut assembly. The first member defines a central aperture therein that is sized to receive the elongate member. The first member also includes a threaded portion that is substantially concentric with the central aperture. A second member having a surface adapted to abut a portion of the article defines a central aperture therein that is sized to receive the elongate member. The second member also comprises a threaded portion that is substantially concentric with the central aperture and threadably engagable with the threaded portion of the first member so that relative rotation between the first and second members changes an axial distance between the surface of the second member and the slip nut assembly when the slip nut assembly is locked in the defined axial position along the elongate member.

Also disclosed is a position adjuster assembly for adjusting an axial position of an article mounted to an elongate member with a slip nut assembly that includes a lower member and an upper member. A bottom surface of the lower member is adopted to be fixedly mounted to the slip nut assembly. A top surface of the lower member includes an externally-threaded portion extending upwardly therefrom that defines a central aperture sized to receive the elongate member. The upper member defines an internally-threaded central aperture therein that is sized to threadably engage the externally-threaded portion of the lower member so that relative rotation between the lower and upper members changes an axial distance between a top surface of the upper member and the slip nut assembly when the slip nut assembly is locked in a defined axial position along the elongate member. A jam nut defining an internally-threaded central aperture therein sized to threadably engage the externally-threaded portion of the lower member is rotatable on the externally-threaded portion of the lower member until the jam nut abuts the upper member thereby preventing relative rotation between the lower and upper members.

A method of adjusting an axial position of an article mounted to an elongate member with a slip nut assembly, may include a step of providing an axial position adjuster assembly that includes first member adapted to mounted to the slip nut assembly. The first member defines a central aperture therein that is sized to receive the elongate member. The first member also includes a threaded portion that is substantially concentric with the central aperture. A second member having a surface adapted to abut a portion of the article defines a central aperture therein that is sized to receive the elongate member. The second member also includes a threaded portion that is substantially concentric with the central aperture and threadably engagable with the threaded portion of the first member. The method may also include the steps of: Mounting the first member of the axial position adjuster assembly to the slip nut assembly; locking the slip nut assembly at a defined axial position along the elongate member; and rotating the first and second members with respect to one another to change the axial distance between the surface of said second member and the slip nut assembly.

Also disclosed is a mounting system for mounting an article to an elongate member that includes a slip nut assembly sized to axially receive the elongate member. The slip nut assembly includes a lock assembly that is moveable between a locked position and an unlocked position so that the lock assembly locks the slip nut assembly at a defined axial position along the elongate member when the lock assembly is in the locked position and allows the slip nut assembly to be moved axially along the elongate member when the lock assembly is in the unlocked position. The mounting system also includes axial position adjuster assembly that includes a first member mounted to the slip nut assembly. The first member defines a central aperture therein that is sized to receive the elongate member. The first member also includes a threaded portion that is substantially concentric with the central aperture. A second member having a surface adapted to abut a portion of the article defines a central aperture therein that is sized to receive the elongate member. The second member also includes a threaded portion that is substantially concentric with the central aperture and threadably engagable with the threaded portion of the first member so that relative rotation between the first and second members changes an axial distance between the surface the second member and the slip nut assembly when the slip nut assembly is locked in the defined axial position along the elongate member.

BRIEF DESCRIPTION OF THE DRAWINGS

Illustrative and presently preferred exemplary embodiments of the disclosed instrumentalities are shown in the drawings in which.

DETAILED DESCRIPTION OF THE PREFERRED EMBODIMENTS

The following is a detailed description of exemplary embodiments t that illustrate the principles of the disclosed instrumentalities. The embodiments are provided to illustrate various aspects of the disclosed instrumentalities. However, the disclosed instrumentalities should not be regarded as limited to any particular embodiment or combination of features. The disclosed instrumentalities teach by way of example and not by limitation. Therefore, of the scope the disclosed instrumentalities encompasses numerous alternatives, modifications, and equivalents to those shown and described herein.

Figure 1:
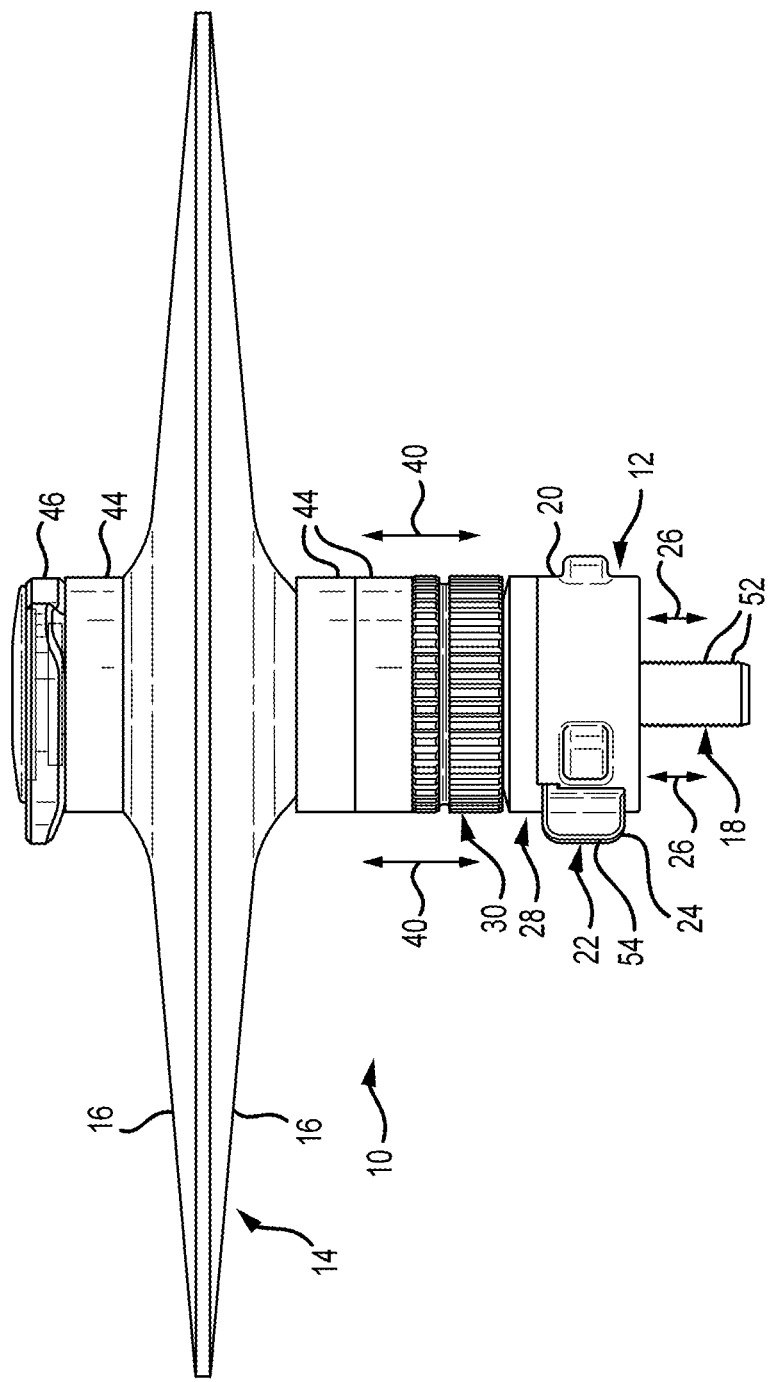
FIG. 1 is a side view in elevation of a position adjuster assembly in combination with a slip nut assembly shown holding a pair of musical cymbals on a rod.

One embodiment of a position adjuster assembly 10 according to the disclosed instrumentalities is shown in FIG. 1 as it may be used in combination with a slip nut assembly 12 to mount an article or articles 14, such as a pair of musical cymbals 16 to an elongate member 18. Slip nut assembly 12 may be used to hold or lock article 14 (e.g., musical cymbals 16) at a defined axial position along elongate member 18. However, there are instances wherein it might be desirable to change or 'fine tune' the axial position of article 14 with respect to slip nut assembly 12 without having to release or unlock slip nut assembly 12 from elongate member 18. Position adjuster assembly 10 allows the axial position of article 14 to be changed or fine-tuned with respect to slip nut assembly 12 without having to release or unlock slip nut assembly 12. In the particular embodiments shown and described herein, the change in axial positioning of cymbals 16 applies an axial force or 'preload' to cymbals 16, thereby tuning or changing the sonic qualities of the cymbals 16.

Slip nut assembly 12 may be of the type shown and described in U.S. Pat. No. 11,854,516, entitled "Slip Nut Assembly," which is hereby specifically incorporated herein by reference for all that it discloses. Briefly, and with reference now primarily to FIGS. 6-8, slip nut assembly 12 may comprise a main body 20 that defines a central aperture 21 therein sized to receive elongate member 18. Slip nut assembly 12 also includes a lock assembly 22 that is movable between a locked position 24 (illustrated in FIG. 6) and an unlocked position (not specifically shown). When lock assembly 22 is in the unlocked position, slip nut assembly 12 may be moved axially along elongate member 18, generally in the directions illustrated by arrows 26. When lock assembly 22 is in the locked position 24, slip nut assembly 12 will be held or locked at a defined axial position along elongate member 18.

Figure 2:
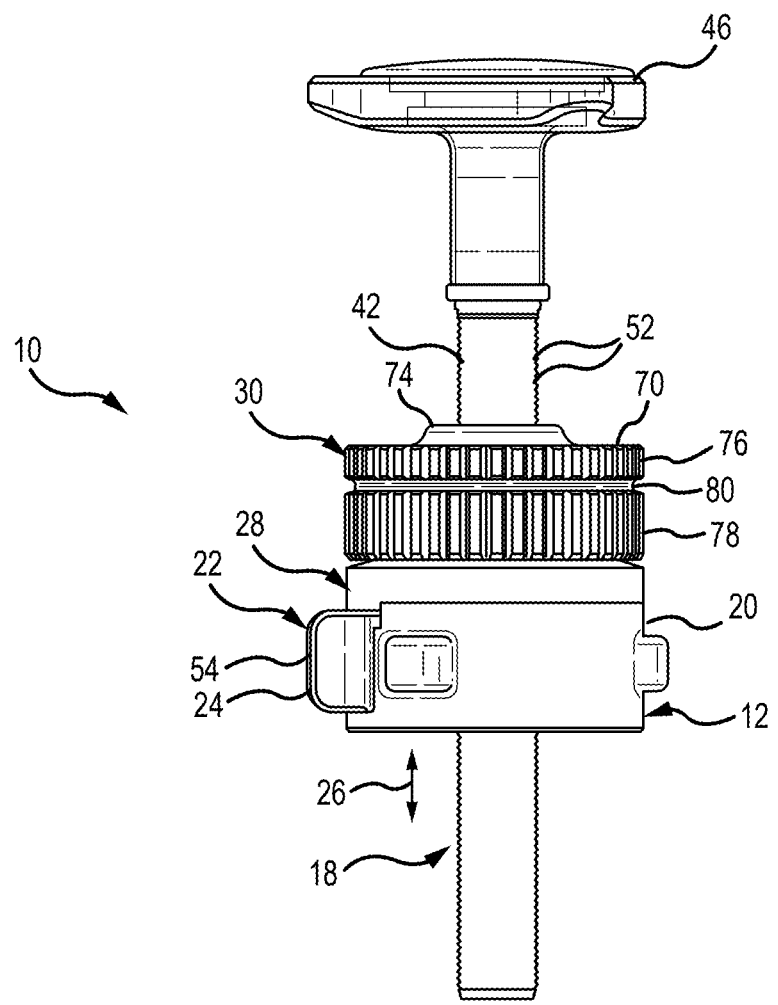
FIG. 2 is a side view in elevation of the combined position adjuster and slip nut assembly illustrated in FIG. 1, but with the musical cymbals removed.
Figure 3:
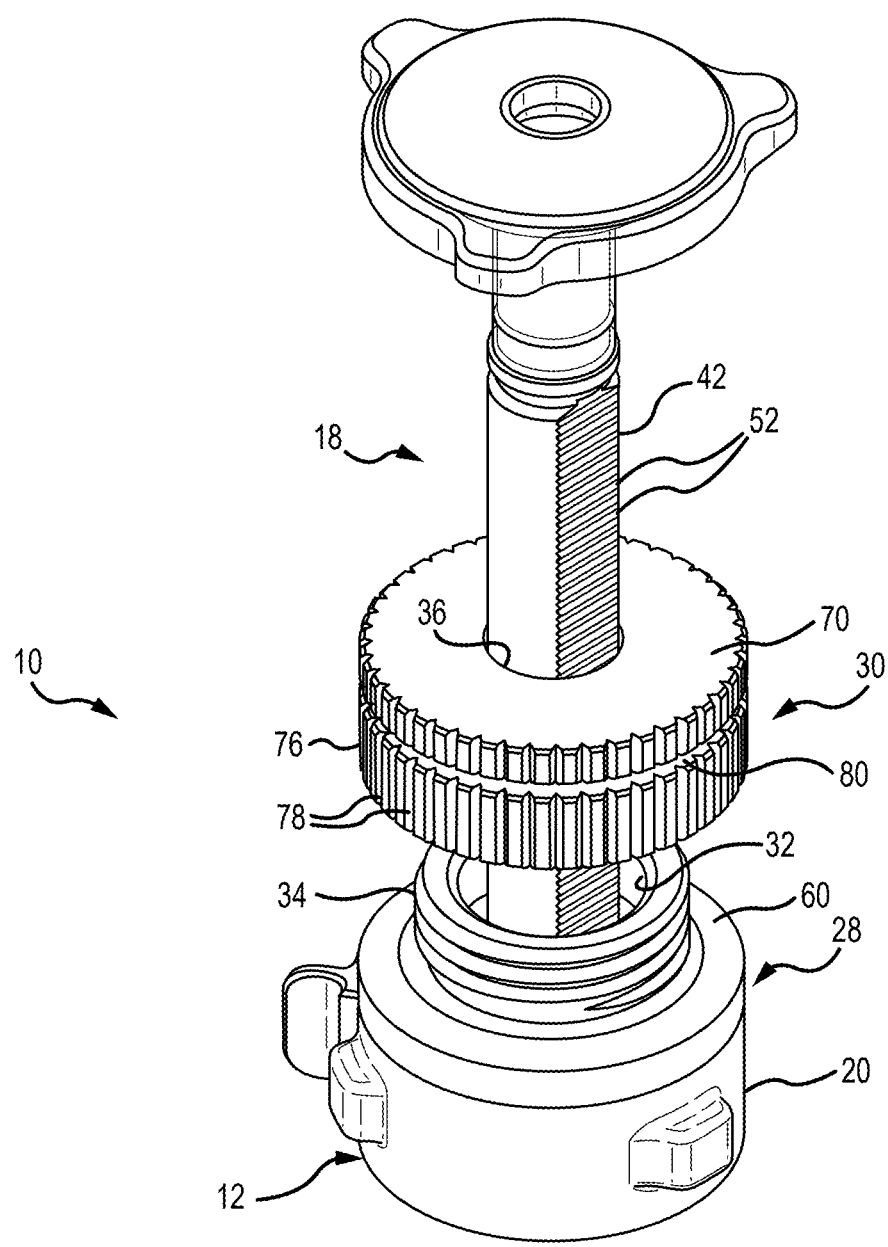
FIG. 3 is an exploded perspective view of the combined position adjuster and slip nut assembly illustrated in FIG. 2 more clearly showing the external threads on the lower member of the position adjuster assembly.
Figure 4:
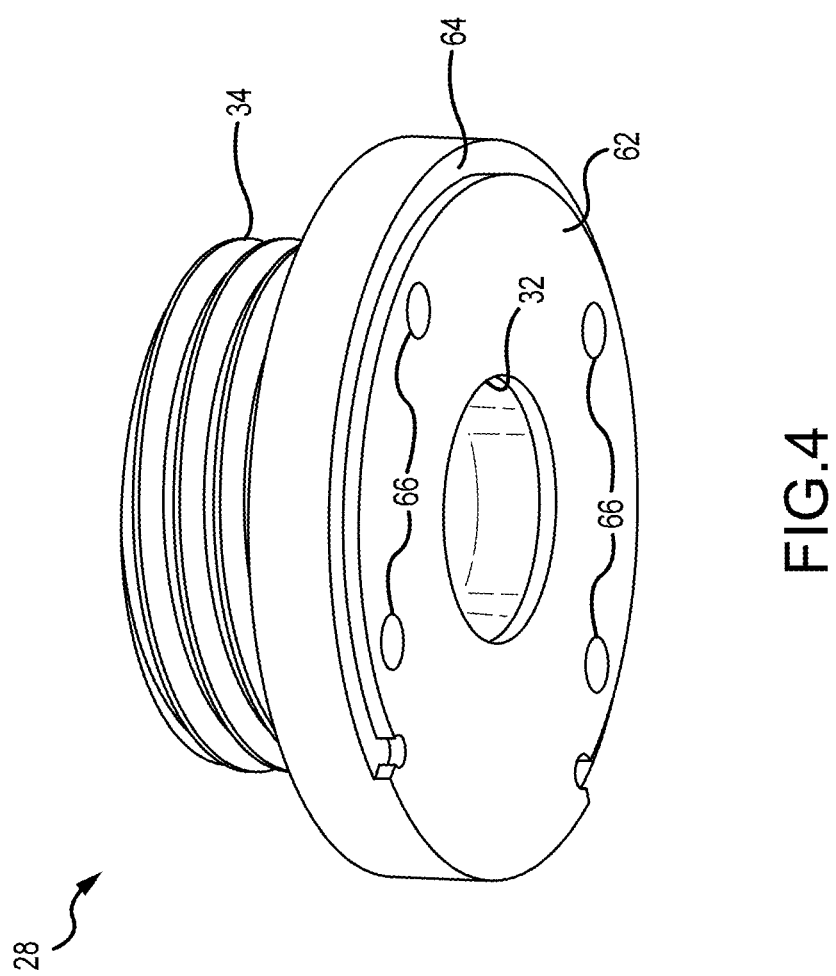
FIG. 4 is a perspective view of the bottom surface of the lower member of the position adjuster assembly showing the locations of mounting holes that allow lower member to be mounted to the slip nut assembly.
Figure 5:
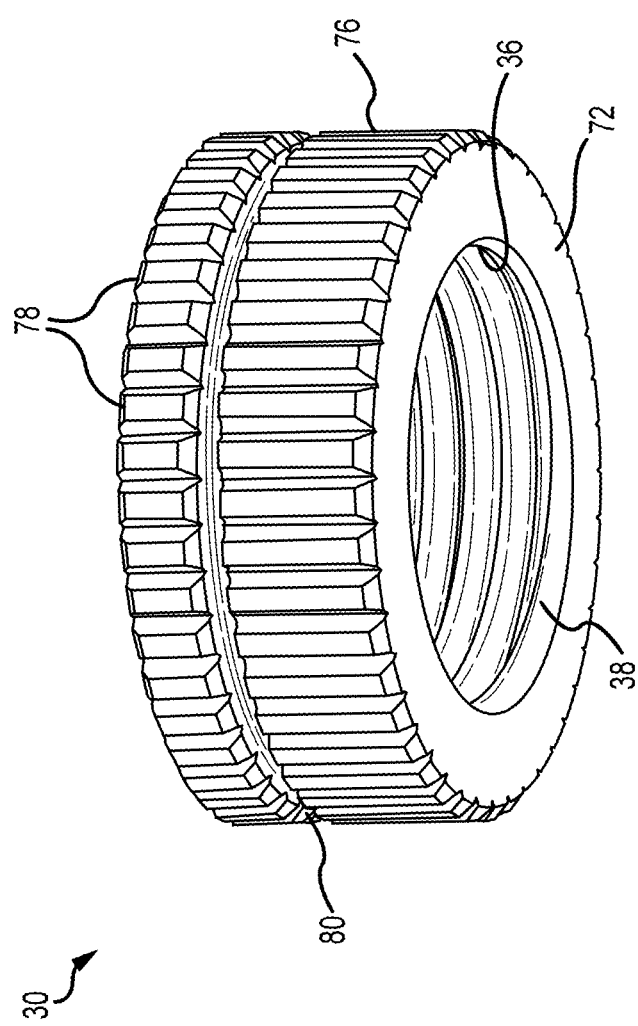
FIG. 5 is a perspective view of the bottom surface of the upper member of the position adjuster assembly more clearly showing the internal threads therein.

With reference now to FIGS. 3-5, with occasional reference to FIGS. 1 and 2, position adjuster assembly 10 may comprise a first or lower member 28 and a second or upper member 30. First or lower member 28 is mounted to main body 20 of slip nut assembly 12 and defines a central aperture 32 therein that is sized to receive elongate member 18. First or lower member 28 may also comprise a threaded portion 34 that is substantially concentric with central aperture 32 defined by lower member 28. Second or upper member 30 defines a central aperture 36 therein that is also sized to receive elongate member 18. Second or upper member 30 may also comprise a threaded portion 38 that is substantially concentric with central aperture 36 defined by upper member 30. Threaded portions 34 and 38 of lower and upper members 28 and 30 are threadably engagable with one another so that relative rotation between lower and upper members 28 and 30 changes an axial distance between upper member 30 and slip nut assembly 12. The change in axial distance between upper member 30 and slip nut assembly 12 thereby allows position adjuster assembly 10, and more specifically upper member 30, to axially move article 14 with respect to slip nut assembly 12, i.e., in the directions indicated by arrows 40 (FIG. 1), even though slip nut assembly 12 is locked in a defined axial position along elongate member 18.

With reference back now to FIGS. 1 and 2, position adjuster assembly 10 and slip nut assembly 12 may be used together to hold or position article 14, such as a pair of musical cymbals 16, in a defined axial position along elongate member 18. More specifically, musical cymbals 16 may be positioned on an upper portion 42 of elongate member 18, with position adjuster assembly 10 and slip nut assembly 12 supporting the cymbals 16 from below. If desired, one or more felt pads 44 may be positioned between cymbals 16 and upper member 30 of position adjuster assembly 10. Cymbals 16 may be secured to top portion 42 of elongate member 18 by a hub member 46 of slip nut assembly 12. If desired, one or more felt pads 44 may be positioned between cymbals 16 and hub member 46, as also best seen in FIG. 1. Thereafter, slip nut assembly 12 may be moved axially along elongate member 18 in the directions indicated by arrow 26. Once the slip nut assembly 12 is in the desired axial position, it may be locked in place by moving lock assembly 22 to the locked position 24. Thereafter, the axial position of article 14 may still be moved or adjusted with respect to the locked-in-place slip nut assembly 12 by rotating second or upper member 30 of position adjuster assembly 10 with respect to first or lower member 28 (lower member 28 is mounted to slip nut assembly 12). That is, relative rotation of lower and upper members 28 and 30 will cause upper member 30 to move axially along elongate member 18 in the directions indicated by arrows 40. This allows a user to finely adjust the axial position of article 14 (e.g., as may be desired to 'tune' musical cymbals 16 by applying a preload thereto) without having to unlock slip nut assembly 12. Stated another way, slip nut assembly 12 may be used to provide for a 'coarse' axial adjustment along elongate member 18 (i.e., in the directions indicated by arrows 26), while position adjuster assembly 10 allows for a 'fine' axial adjustment (i.e., in the directions indicated by arrows 40).

A significant advantage of the position adjuster assembly according to the disclosed instrumentalities is that it may be used to provide a fine axial adjustment to articles secured with slip nut assemblies. That is, the axial positioning of most slip nut assemblies is somewhat coarse, limiting the ability of a user to finely adjust the axial positioning of the slip nut assembly. When used in conjunction with a slip nut assembly used to retain musical cymbals, position adjuster assembly 10 may be used to provide a fine axial adjustment (i.e., compared with the relatively coarse axial adjustment of the slip nut assembly) thereby allowing the musical cymbals to be tuned by varying the amount of axial preload applied to the cymbals, all while avoiding the need to release the slip nut assembly.

Still yet another advantage of the position adjuster assembly is that it may be readily retro-fit to most slip nut assemblies, providing for enhanced utility and functionality of the slip nuts. Still yet other advantages are associated with the use of a jam nut. For example, the jam nut locks the position adjuster assembly at the desired position, thereby maintaining the tune of the musical cymbals even after long playing sessions.

Having briefly described certain embodiments of the position adjuster assembly to the disclosed according instrumentalities, as well as some of its more significant features and advantages, various embodiments of the position adjuster assembly will now be described in detail. However, before proceeding with the description it should be noted that while the various embodiments are shown and described herein as they could be used in conjunction with a particular type of slip nut assembly to mount one or more musical cymbals to an elongate member, the disclosed instrumentalities are not limited to use with any particular type of slip nut assembly, either now known in the art or that may be developed in the future. Consequently, the disclosed instrumentalities should not be regarded as limited to any particular type of slip nut assembly not to any particular type of article.

Referring back now to FIGS. 1 and 2, one embodiment of a position adjuster assembly 10 is shown and described herein as it could be used in conjunction with a slip nut assembly 12 to mount an article 14, such as a pair of musical cymbals 16, to an elongate member 18. As briefly mentioned above, slip nut assembly 12 may be of the type shown and described in U.S. Pat. No. 11,854,516, entitled "Slip Nut Assembly," which is hereby specifically incorporated herein by reference for all that it discloses.

Figure 6:
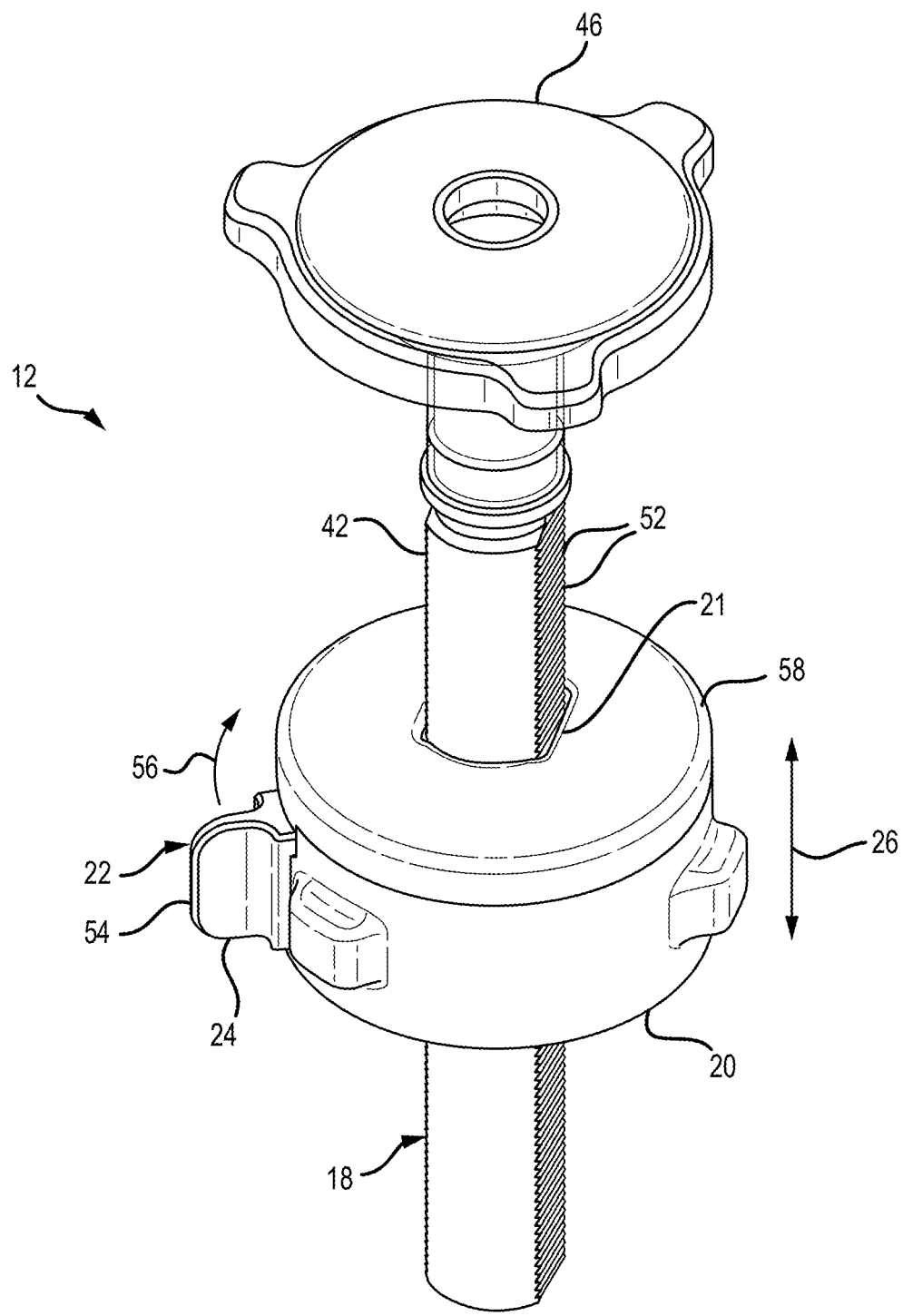
FIG. 6 is a perspective view of a prior art slip nut assembly showing an upper cap member that can be removed and replaced by the lower member of the position adjuster assembly.
Figure 7:
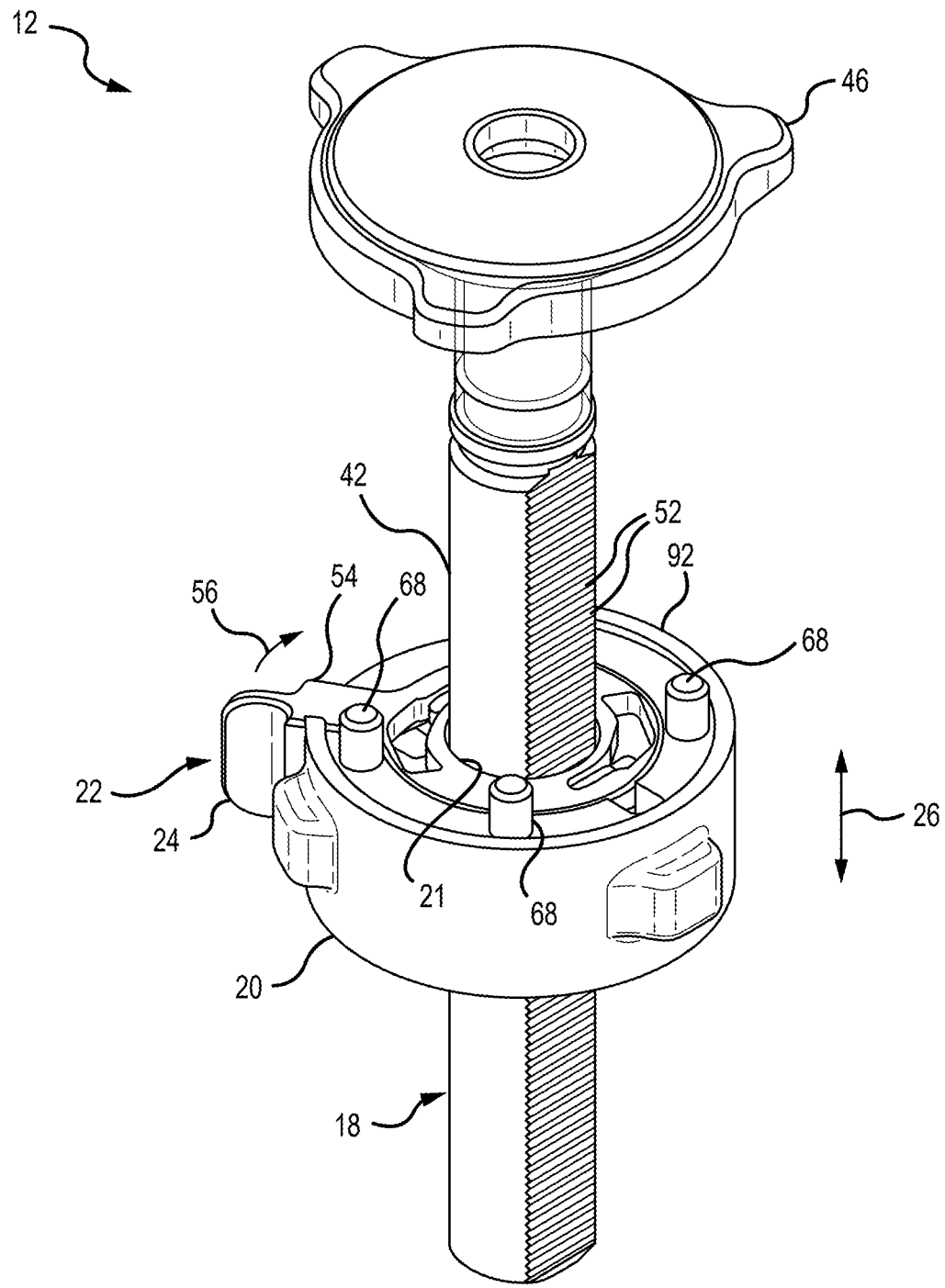
FIG. 7 is a perspective view of the prior art slip nut assembly illustrated in FIG. 6 with the upper cap member removed to more clearly show the actuator of the of the lock assembly.
Figure 8:
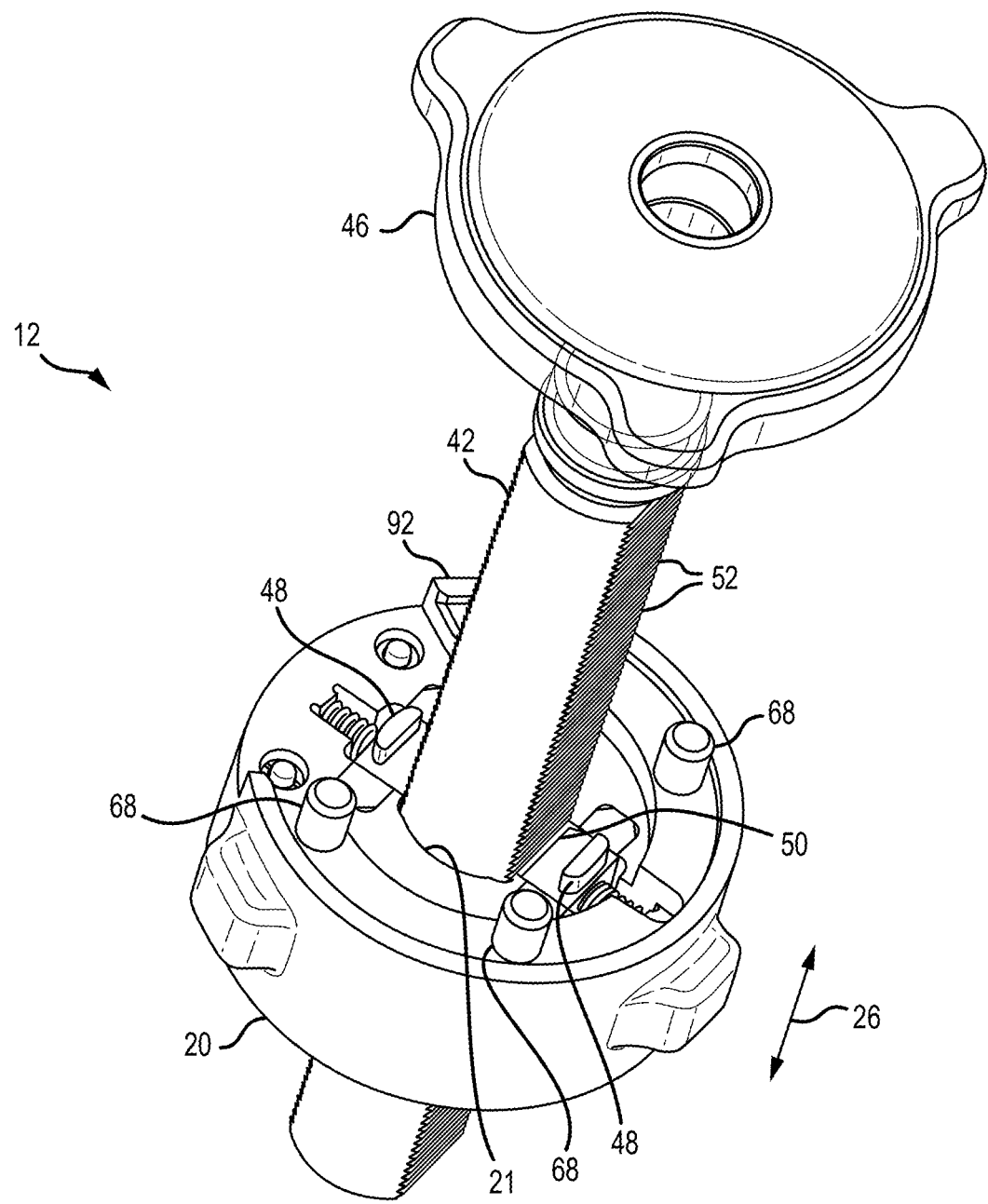
FIG. 8 is a perspective view of the prior art slip nut assembly illustrated in FIG. 7 with the actuator removed to show the internal arrangement of the pawls.

With reference now primarily to FIGS. 6-8, slip nut assembly 12 may comprise a main body 20 that defines a central aperture 21 therein that is sized to receive elongate member 18 so that slip nut assembly 12 may be moved axially along elongate member 18, i.e., in the directions indicated by arrows 26. Slip nut assembly 12 includes a lock assembly 22 that, when moved to locked position 24, locks or securely holds lock slip nut assembly 12 at a desired axial position along elongate member 18.

In the particular slip nut assembly 12 shown and described herein, lock assembly 22 may comprise a pair of pawls 48 (FIG. 8) that are moveably mounted within main body 20 so that pawls 48 may be moved between a locked or engaged position and a disengaged position. When in the engaged position, teeth 50 provided on pawls 48 engage at least some of a plurality of ridges 52 provided on elongate member 18. Ridges 52 extend along the axial direction of elongate member 18. An actuator 54 (FIG. 7) operatively associated with pawl(s) 48 and main body 20 of slip nut assembly 12 may be used to move pawls 48 between the engaged and disengaged position(s) thereby locking and unlocking slip nut assembly 12 in a defined axial position along elongate member 18. In FIGS. 6-8, actuator 54 is shown in the locked position 24. When rotated in the direction indicated by arrow 56, actuator 54 unlocks pawl(s) 48, disengaging them from ridges 52, thereby unlocking slip nut assembly 12 and allowing it to move axially along elongate member 18 in the directions indicated by arrows 26. A cap member 58 secured to main body 20 of slip nut assembly 12 retains and encloses the internal components (e.g., pawls 48 and actuator 54) housed within main body 20. It should be noted that when used in conjunction with position adjuster assembly 10, cap member 58 of slip nut assembly 12 is removed and replaced by lower member 28 of position adjuster assembly, as best seen in FIGS. 1-3.

Referring back now to FIGS. 3-5, position adjuster assembly 10 may comprise a first or lower member 28 and a second or upper member 30. First or lower member 28 is mounted to slip nut assembly 12 (e.g., in place of cap member 58), whereas second member 30 is threadably engaged with first member 28. In the particular embodiments shown and described herein, lower member 28 may be provided with external threads 34, whereas upper member 38 may be provided with internal threads 38. See also FIG. 9(*a*). Alternatively, and in another embodiment 110 illustrated in FIG. 9(*b*), lower member 128 may be provided with internal threads 134, whereas upper member 136 may be provided with external threads 138.

As mentioned earlier, if position adjuster assembly 10 is to be used in conjunction with a slip nut assembly 12 of the type described in U.S. Pat. No. 11,854,516, then lower member 28 may be configured to mount to body 20 of slip nut assembly 12 in place of cap member 58. More specifically, and with reference now to FIGS. 3, 4, 7, and 8, lower member 28 may define a top surface 60 and a bottom surface

62. Top surface 60 of lower member 28 may have a threaded portion 34 extending therefrom that defines a central aperture 32 therein that is sized to receive elongate member 18. Bottom surface 62 of lower member 28 is adapted to be mounted to the body 20 of slip nut assembly 12, replacing cap member 58. Accordingly, bottom surface 62 of lower member 28 is provided with a recessed perimeter portion 64 sized to engage a raised portion 92 of main body 20 of slip nut assembly 12. Bottom surface 62 of lower member 28 is also provided with threaded holes 66 sized to receive existing fasteners 68, e.g., screws or bolts, that were previously used to secure cap member 58 to main body 20 of slip nut assembly 12. Alternatively, other arrangements are possible, as would become apparent to persons having ordinary skill in the art after having become familiar with the teachings provided herein. Therefore, the disclosed instrumentalities should not be regarded as limited to the particular mounting arrangement for lower member 28 shown and described herein.

Referring now to FIGS. 3 and 5, second or upper member 30 may define a top surface 70 and a bottom surface 72. Top surface 70 may be adapted to abut a portion of article 14. In some embodiments, top surface 70 of upper member 30 may be provided with a raised central portion 74, as best seen in FIG. 2, although the provision of a raised central portion 74 is not required. Upper member 30 also defines a central aperture 36 sized to receive elongate member 18. In one embodiment, central aperture 36 may be provided with internal threads 38 sized to threadably receive threaded portion 34 of lower member 28.

To facilitate rotation of upper member 30 with respect to lower member 28 which, in the particular embodiments shown and described herein, is fastened to slip nut assembly 12, perimeter or outer surface 76 of upper member 30 may be provided with one or more axial grooves or flutes 78 therein. If desired, outer surface 58 may also be provided with one or more circumferential slots 80 therein. Alternatively, other arrangements could be used to facilitate easy rotation of upper member 30. For example, outer surface 76 of upper member 30 may be knurled.

Lower and upper members 28 and 30 may be fabricated from any of a wide range of materials, such as metals or plastics, that would be suitable or desirable for the particular application, as would become apparent to persons having ordinary skill in the art after having become familiar with the teachings provided herein. In the particular embodiments shown and described herein, lower and upper members 28 and 30 are fabricated from an aluminum alloy.

Figure 9A:
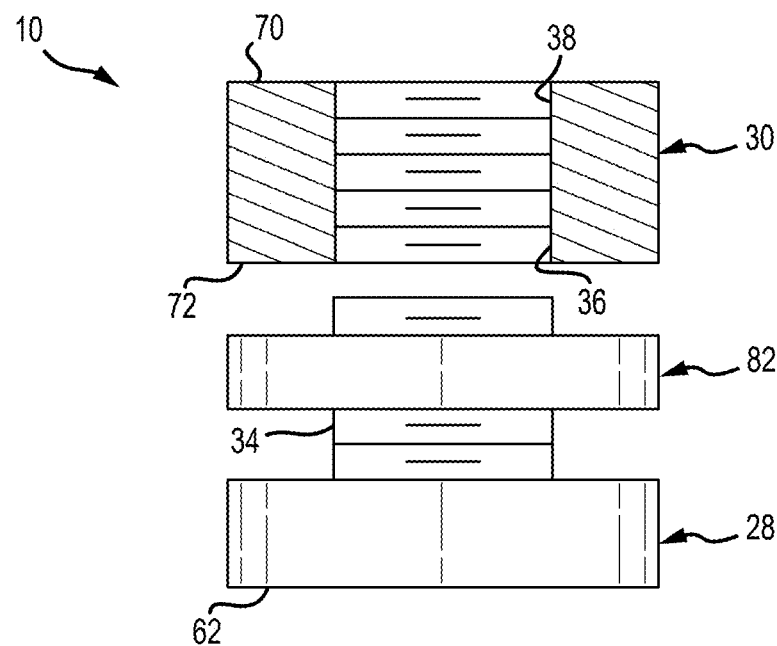
FIGS. 9(a,b) are cross-sectional views in elevation of two different embodiments of the position adjuster assembly with alternative internal and external thread configurations.
Figure 9B:
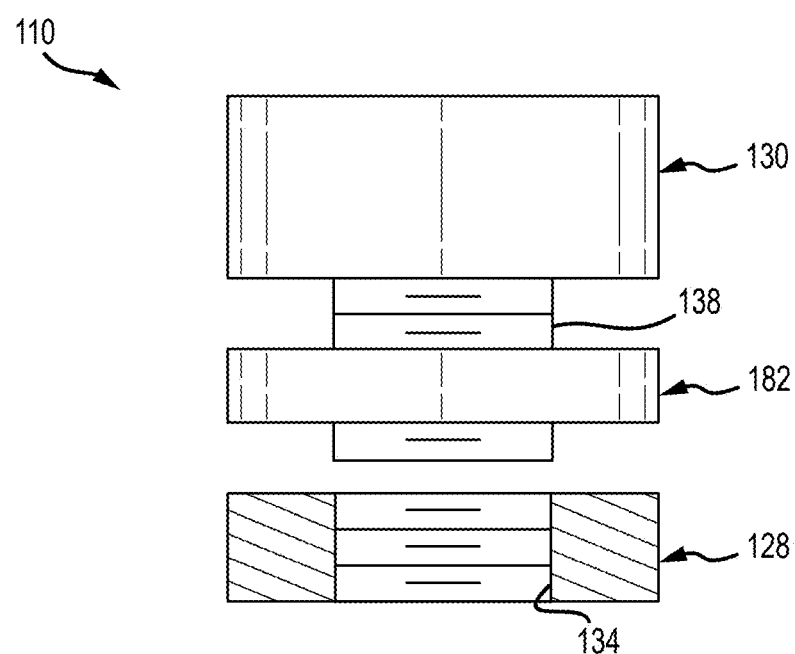

Other embodiments, arrangements, and variations of the disclosed instrumentalities are possible. For example, and with reference now to FIGS. 10 and 11, some embodiments of position adjuster assembly 10 may be provided with a jam nut 82. Jam nut 82 defines a threaded central aperture 84 therein that is sized to threadably engage at least one of lower member 28 and upper member 30. For example, if lower member 28 is provided with external threads 34, jam nut 82 threadably engages the external threads 34 of lower member 28, as best seen in FIG. 9*a*. However, if the arrangement is reversed and upper member 130 is provided with external threads 138, then threaded aperture 84 of jam nut 82 will threadably engage external threads 138 provided on upper member 130, as best seen in FIG. 9*b*. In any event, the threadable engagement of jam nut 82 with external threads 34 or 138 provided on at least one of lower member 28 or upper member 130, respectively, allows jam nut 82 to be rotated until it firmly contacts either of upper member 30 or lower member 128, as the case may be. The engagement of jam nut 82 with upper member 30 or lower member 128 prevents relative rotation of lower and upper members 28 and 30 (or lower and upper members 128 and 130), therefore 'locking' or securely holding position adjuster assembly 10 in the set axial position.

Figure 10:
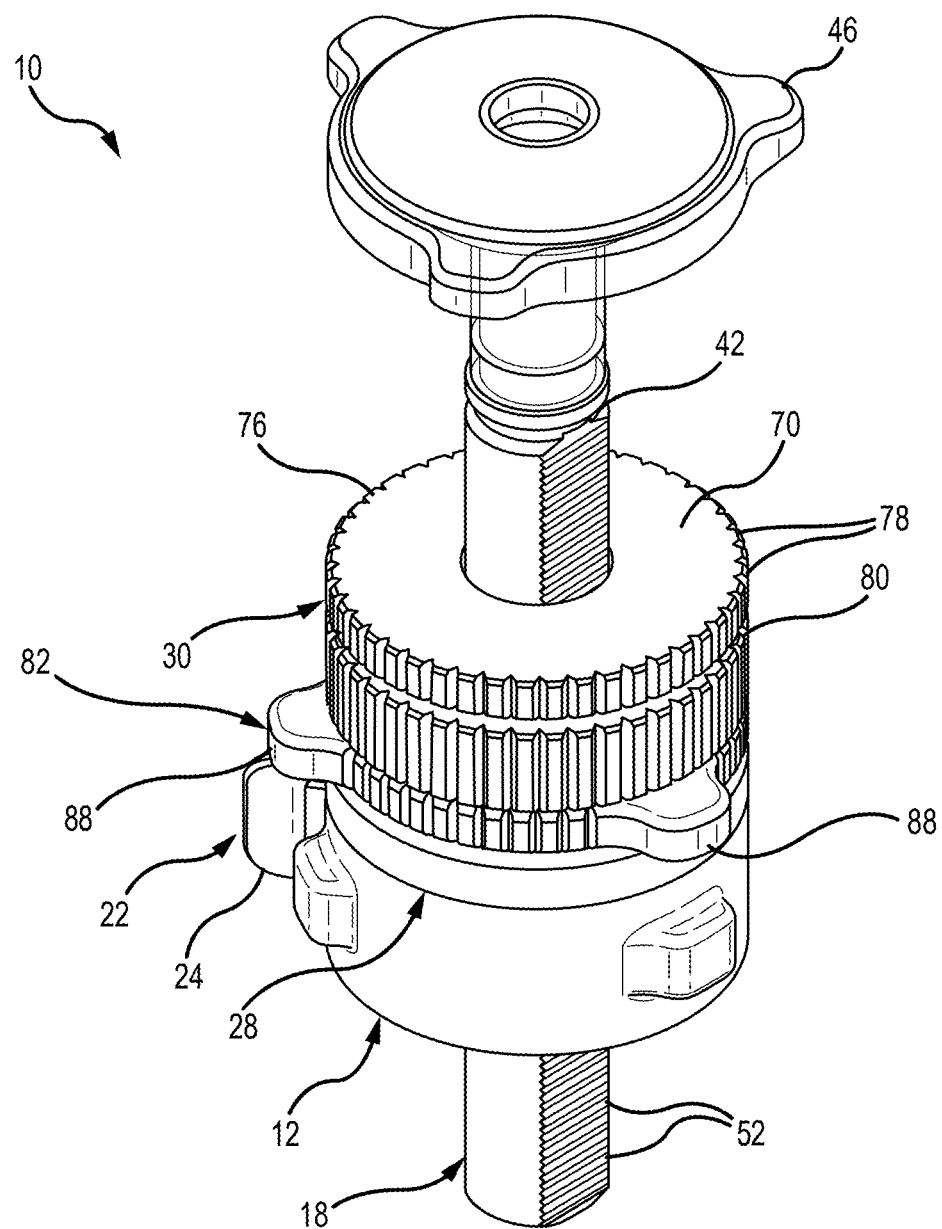
FIG. 10 is a perspective view of another embodiment of the position adjuster assembly with a jam nut.
Figure 11:
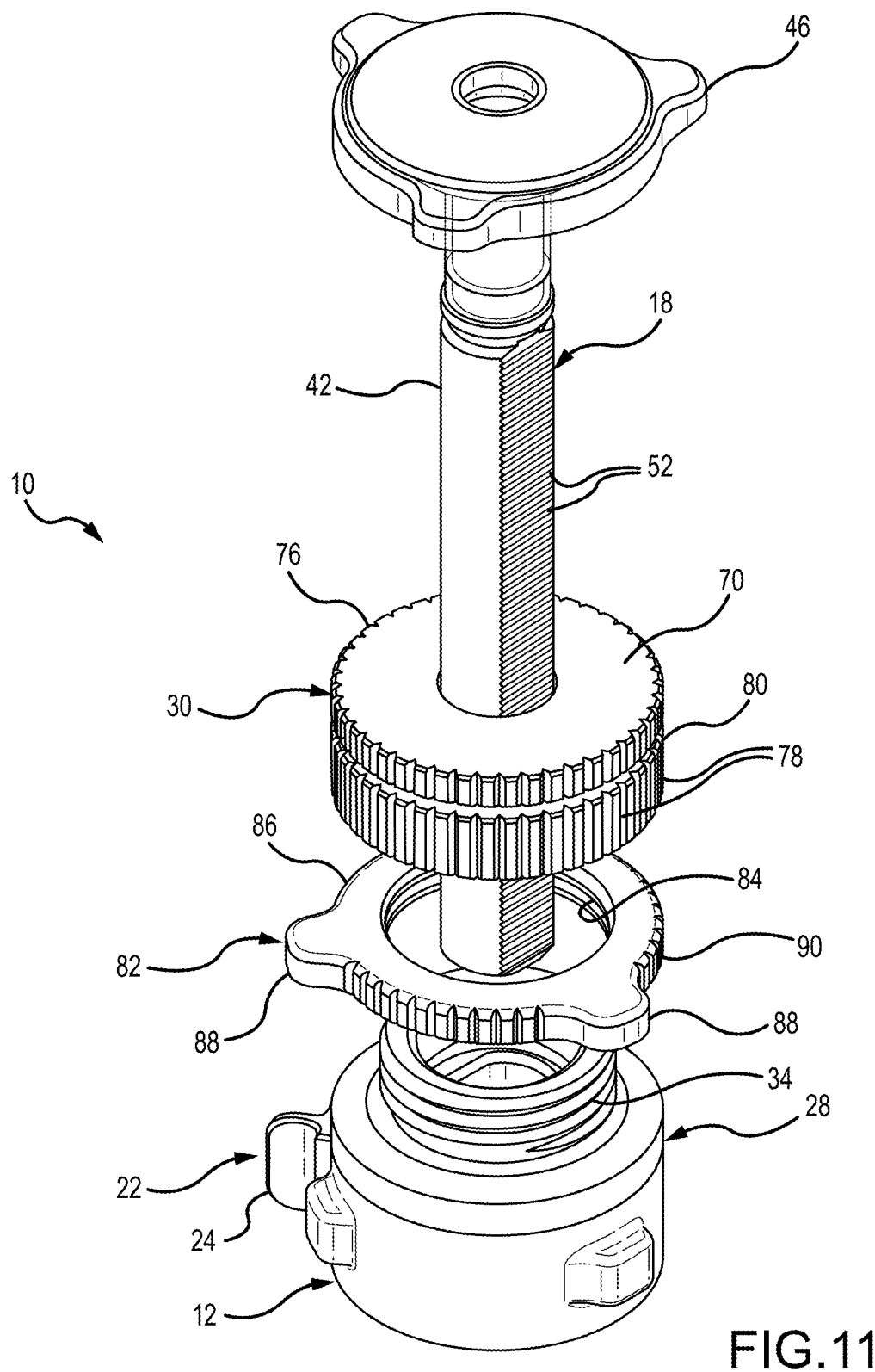
FIG. 11 is an exploded perspective view of the position adjuster and jam nut assembly illustrated in FIG. 10 more clearly showing the internal threads of the jam nut.

To facilitate easy tightening of jam nut 82, the perimeter or outer surface 86 of jam nut 82 may be provided with one or more lugs 88 thereon that extend generally radially outwardly from outer surface 86, as best seen in FIGS. 10 and 11. If desired, perimeter or outer surface 86 of jam nut 82 also may be provided with one or more axial grooves or flutes 90 therein. Jam nut 82 may be fabricated from any of a wide range of materials, such as metals or plastics, that would be suitable for the particular application. In the particular embodiments shown and described herein, jam nut 82 is fabricated from an aluminum alloy.

With reference back now to FIGS. 1 and 2, position adjuster 10 and slip nut assembly 12 may be used as follows to hold or position article 14, such as a pair musical cymbals 16, in a defined axial position along elongate member 18 and allow them to be tuned by adjusting an axial preload applied thereto. As a first step, lower member 28 of position adjuster assembly 10 may be mounted or affixed to slip nut assembly 12. This may be accomplished by removing cap member 58 of slip nut assembly 12 and replacing it with lower member 28 in the manner already described. Thereafter, musical cymbals 16 may be placed over top portion 42 of elongate member 16. If desired one or more pads 44 (e.g., felt pads) may be positioned between upper member 30 and the lower of the two cymbals 16. The upper of the two cymbals 16 may be secured to top portion 52 of elongate member 18 by hub member 46. Slip nut assembly 12 (along with position adjuster assembly 10) may be moved axially along elongate member 18, i.e., in the directions indicated by arrows 26) to a desired position. Lock assembly 22 may be moved to the locked position 24 (e.g., by rotating actuator 54) to hold slip nut assembly 12 at the desired position. Thereafter, the preload applied to musical cymbals 16 may be adjusted by rotating upper member 30, which moves upper member 30 axially in the directions indicated by arrows 40, all while leaving slip nut assembly 12 in the locked position 24. In embodiments having a jam nut 82, jam nut 82 may be tightened to prevent relative rotation of lower and upper members 28 and 30 (or 128 and 130, as the case may be).

Unless defined otherwise, all technical and scientific terms used herein have the same meaning as commonly understood by persons having ordinary skill in the art to which the invention pertains. Although any systems, methods, and materials similar or equivalent to those described herein can be used in practice for testing of the present invention, the preferred systems, methods, and materials are described herein.

In understanding the scope of the present invention, the articles "a" and "an" are used herein to refer to one or to more than one (i.e., to at least one) of the grammatical object of the article. By way of example, "an element" means one element or more than one element. The term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. When referring to a measurable value, such as an amount, a temporal duration, and the like, these terms are meant to encompass variations of at least ±20% or ±10%, more preferably ±5%, even more preferably ±1%, and still more preferably ±0.1% from the specified value, as such variations are appropriate and as would be understood by persons having ordinary skill in the art to which the invention pertains.

Throughout this disclosure, various aspects of the invention may be presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.6, 3, 4, 5, 5.7, and 6. This applies regardless of the breadth of the range.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A position adjuster assembly for adjusting an axial position of an article mounted to an elongate member with a slip nut assembly when the slip nut assembly is locked in a defined axial position along the elongate member, said position adjuster assembly comprising:

a first member adapted to be mounted to the slip nut assembly, said first member defining a central aperture therein sized to receive the elongate member, said first member also comprising a threaded portion that is substantially concentric with the central aperture defined by said first member; and a second member having a surface adapted to abut a portion of the article, said second member defining a central aperture therein sized to receive the elongate member, said second member also comprising a threaded portion that is substantially concentric with the central aperture defined by said second member and threadably engagable with the threaded portion of said first member so that relative rotation between said first and second members changes an axial distance between the surface of said second member and the slip nut assembly when the slip nut assembly is locked in the defined axial position along the elongate member.

2. The position adjuster assembly of claim 1, wherein the threaded portion of said first member comprises external threads and wherein the threaded portion of said second member comprises internal threads.

3. The position adjuster assembly of claim 1, wherein the threaded portion of said first member comprises internal threads and wherein the threaded portion of said second member comprises external threads.

4. The position adjuster assembly of claim 1, further comprising a jam nut defining a central aperture therein, said jam nut also comprising a threaded portion that is substantially concentric with the central aperture defined by said jam nut and threadably engagable with the threads on at least one of said first member and said second member, said jam nut being rotatable on the engaged threads until said jam nut abuts at least one of the first and second members thereby preventing relative rotation between said first and second members.

5. The position adjuster assembly of claim 4, wherein the threaded portion of said first member comprises external threads, wherein the threaded portion of said second member comprises internal threads, and wherein the threaded portion of said jam nut comprises internal threads sized to engage the external threads of said first member.

6. The position adjuster assembly of claim 4, wherein the threaded portion of said first member comprises internal threads, wherein the threaded portion of said second member comprises external threads, and wherein the threaded portion of said jam nut comprises internal threads sized to engage the external threads of said second member.

7. The position adjuster assembly of claim 1, wherein said second member defines a substantially cylindrical outer surface.

8. The position adjuster assembly of claim 1, wherein the substantially cylindrical outer surface of said second member defines a plurality of axial grooves therein.

9. The position adjuster assembly of claim 1, wherein the substantially cylindrical outer surface of said second member defines at least one circumferential groove therein.

10. The position adjuster assembly of claim 1, wherein said first member defines a substantially cylindrical outer surface.

11. The position adjuster assembly of claim 1, wherein the surface of said second member comprises a raised central portion adapted to abut the article.

12. A position adjuster assembly for adjusting an axial position of an article mounted to an elongate member with a slip nut assembly when the slip nut assembly is locked in a defined axial position along the elongate member, said position adjuster assembly comprising:

a lower member having a top surface and a bottom surface, the bottom surface of said lower member being adapted to be fixedly mounted to the slip nut assembly, the top surface of said lower member having an externally-threaded portion extending upwardly therefrom, the externally-threaded portion defining a central aperture therein sized to receive the elongate member;

an upper member having a top surface and a bottom surface, the top surface of said upper member being adapted to abut a portion of the article, said upper member defining an internally-threaded central aperture therein sized to threadably engage the externally-threaded portion of said lower member so that relative rotation between said lower and upper members changes an axial distance between the top surface of said upper member and the slip nut assembly when the slip nut assembly is locked in the defined axial position; and a jam nut defining an internally-threaded central aperture therein sized to threadably engage the externally-threaded portion of said lower member, said jam nut being rotatable on the externally-threaded portion of said lower member until said jam nut abuts said upper member thereby preventing relative rotation between said lower and upper members.

13. The position adjuster assembly of claim 12, wherein the bottom surface of said lower member defines a plurality of threaded holes therein sized threadably engage threaded fasteners of the slip nut assembly.

14. The position adjuster assembly of claim 12, wherein said jam nut defines a substantially cylindrical outer surface.

15. The position adjuster assembly of claim 14, wherein the substantially cylindrical outer surface defined by said jam nut also defines a plurality of lugs extending generally radially outwardly from the substantially cylindrical outer surface.

16. A mounting system for mounting an article to an elongate member, comprising:

a slip nut assembly sized to axially receive the elongate member, said slip nut assembly including a lock assembly that is moveable between a locked position and an unlocked position, said lock assembly locking said slip nut assembly at a defined axial position along the elongate member when said lock assembly is in the locked position, said lock assembly allowing said slip nut assembly to be moved axially along the elongate member when said lock is in the unlocked position; and an axial position adjuster assembly operatively associated with said slip nut assembly, said axial position adjuster assembly comprising:

a first member defining a central aperture therein sized to receive the elongate member, said first member also comprising a threaded portion that is substantially concentric with the central aperture defined by said first member; and a second member having a surface adapted to abut a portion of the article, said second member defining a central aperture therein sized to receive the elongate member, said second member also comprising a threaded portion that is substantially concentric with the central aperture defined by said second member and threadably engagable with the threaded portion of said first member so that relative rotation between said first and second members changes an axial distance between the surface said second member and said slip nut assembly when said slip nut assembly is locked in the defined axial position along the elongate member.

17. The mounting system of claim 16, wherein said slip nut assembly further comprises a body and wherein said lock assembly of said slip nut assembly further comprises:

a pawl having a plurality of teeth provided thereon, said pawl being moveably mounted to said body so that pawl can be moved between an engaged position and a disengaged position, the teeth of said pawl engaging at least some of a plurality of ridges provided on the elongate member when said pawl is in the engaged position to lock said slip nut assembly at a defined axial position along said elongate member; and an actuator operatively associated with said pawl, said actuator moving said pawl between the engaged position and the disengaged position.

18. A method of adjusting an axial position of an article mounted to an elongate member with a slip nut assembly when the slip nut assembly is locked in a defined axial position along the elongate member, comprising:

providing an axial position adjuster assembly, said axial position adjuster assembly comprising:

a first member adapted to mounted to the slip nut assembly, said first member defining a central aperture therein sized to receive the elongate member, said first member also comprising a threaded portion that is substantially concentric with the central aperture defined by said first member; and a second member having a surface adapted to abut a portion of the article, said second member defining a central aperture therein sized to receive the elongate member, said second member also comprising a threaded portion that is substantially concentric with the central aperture defined by said second member and threadably engagable with the threaded portion of said first member;

mounting said first member of said axial position adjuster assembly to the slip nut assembly;

locking the slip nut assembly at a defined axial position along the elongate member; and rotating the first and second members with respect to one another to change the axial distance between the surface of said second member and the slip nut assembly.

19. The method of claim 18, wherein mounting said first member of said axial position adjuster assembly to the slip nut assembly further comprises:

removing a cap from the slip nut assembly; and mounting said first member to the slip nut assembly in place of the removed cap.

20. The method of claim 18, further comprising:

providing a jam nut defining a central aperture therein, said jam nut also comprising a threaded portion that is substantially concentric with the central aperture defined by said jam nut and threadably engagable with the threads on at least one of said first member and said second member;

threading said jam nut onto the threads of at least one of said first member and said second member so that said jam nut is substantially between said first and second members; and rotating said jam nut with respect to said first and second members until said jam nut abuts at least one of the first and second members thereby preventing prevent relative rotation between said first and second members.

\* \* \* \* \*